May 30, 1972  R. L. CORBIN ET AL  3,666,564

BATTERY COVER WITH INTEGRAL VENTING SYSTEM

Filed Sept. 12, 1969

INVENTORS
Ralph L. Corbin,
Richard A. Jones, &
Robert G. Byers

BY  L. J. Wallace
ATTORNEY

United States Patent Office 3,666,564
Patented May 30, 1972

3,666,564
BATTERY COVER WITH INTEGRAL
VENTING SYSTEM
Ralph L. Corbin, Richard A. Jones, and Robert G. Byers, Anderson, Ind., assignors to General Motors Corporation, Detroit, Mich.
Filed Sept. 12, 1969, Ser. No. 857,342
Int. Cl. H01m 1/06
U.S. Cl. 136—170                                    4 Claims

ABSTRACT OF THE DISCLOSURE

A multicell casing is disclosed which has a covering assembly comprising a cover member, a unitary filler cap member and a venting system for separating and collecting electrolyte from emanated gas. In the venting system disclosed, each cell has its own elongated horizontal vent chamber containing slush baffles. Each vent chamber is in fluid communication with a longitudinally extending horizontal manifold. The slush baffles are integral with the unitary filler cap member which is flushly seated within the covering member to form an upper wall for the individual vent chambers.

BACKGROUND OF THE INVENTION

This invention relates to battery casings and more particularly to casings for lead-acid storage batteries.

Lead-acid automotive-type storage batteries are frequently neglected by vehicle owners. Moreover, lead-acid storage batteries are often used in non-vehicle applications where their placement makes servicing difficult. Hence, it is desirable to make such batteries more maintenance free. It is currently necessary to periodically service lead-acid automotive-type storage batteries in order to obtain maximum life and performance. For various well known reasons gases are generated during use of the battery that entrain the battery fluid and carry it out to the battery ambient. Evaporation can also cause a loss of water from the battery fluid. The lost water can be replaced with distilled water. However, it is frequently replaced with impure water producing a variety of deleterious results. The acid in the battery fluid lost to the battery ambient is not as conveniently replaced. Moreover, it corrodes any metal parts adjacent the battery, particularly the battery terminals and connectors. Corroded terminals and connectors substantially reduce the power available from the battery to the system it supplies.

Present cell chemistry of the commercial lead-storage battery does not permit one to merely seal the battery case and thereby eliminate the fluid loss problem. It must be vented to accommodate gases generated on charging.

Accordingly, if this battery is to be more maintenance free it should be vented with a system that minimizes evaporative and entrained liquid losses. Whatever gases are generated during battery operation should be stripped of their fluids before exiting the battery casing. The venting and condensing system in automotive applications, however complex, should be integral with the battery casing to be commercially practical. For example, the battery must be readily mass producible at costs which are at least commensurate to present models. Moreover, the system must be small but extremely effective to be contained within the battery casing of a standard size automobile-type battery without decreasing the ampere-hour capacity currently available for that standard size. In fact, current design demands are such that this venting system should be so small and effective that ampere-hour capacity of that standard size battery might even be increased. Of course, even after satisfying these demands, the battery must still be virtually spill-proof.

SUMMARY OF THE INVENTION

Accordingly, it is a principal object of this invention to provide a more maintenance free battery.

Another object of this invention is to provide a battery cover assembly having a small but effective integral venting system.

A further object of this invention is to provide a novel venting system for a storage battery.

It is still another object of this invention to provide a battery casing for increasing ampere-hour capacity of a standard size lead-acid storage.

These and other objects of the invention are attained with a battery construction having a cover assembly with an integral complex venting system. The cover assembly includes a cover member and unitary filler cap member which cooperate to form elongated transverse vent chambers and a horizontal elongated longitudinally extending manifold. The manifold is in fluid communication with each vent chamber. The vent chambers each include a convexly curved ramp and slush baffles which depend from the filler cap member.

BRIEF DESCRIPTION OF THE DRAWINGS

Other objects, features and advantages of this invention will become more apparent from the following description of the preferred example and from the drawings in which.

DESCRIPTION OF THE PREFERRED EMBODIMENTS

Figure 1:
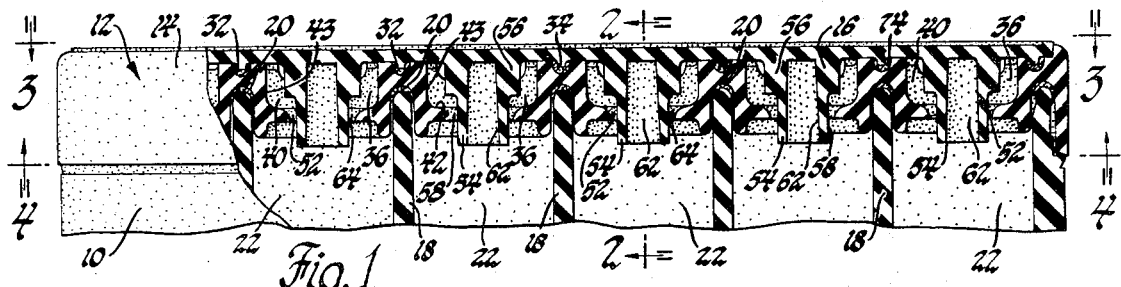
FIG. 1 is a partially broken away elevational view of the upper section of a lead-acid storage battery constructed in accordance with this invention.
Figure 2:
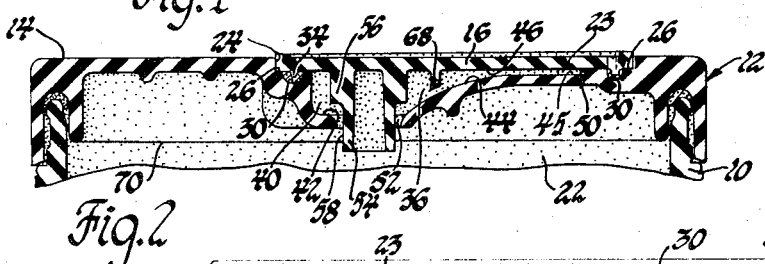
FIG. 2 is a sectional view taken along line 2—2 of FIG. 1.
Figure 3:
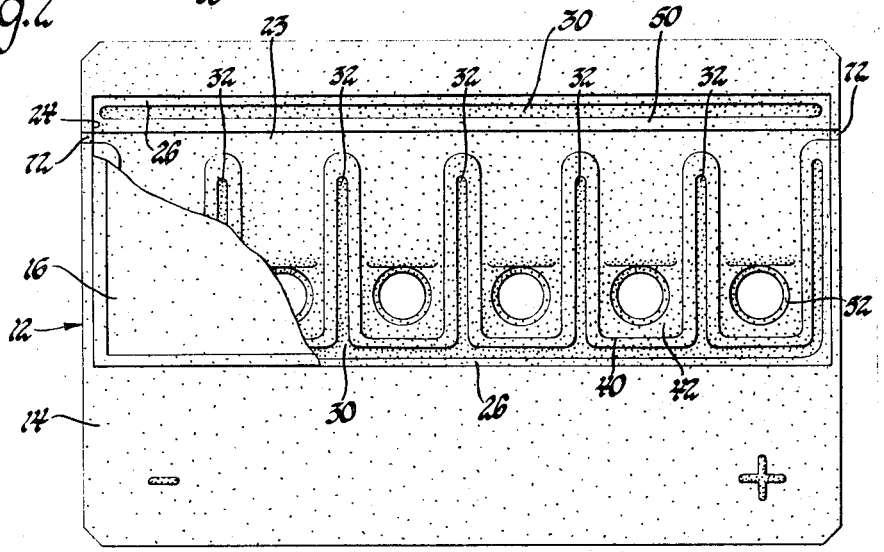
FIG. 3 is a sectional view taken along line 3—3 of FIG. 1.
Figure 4:
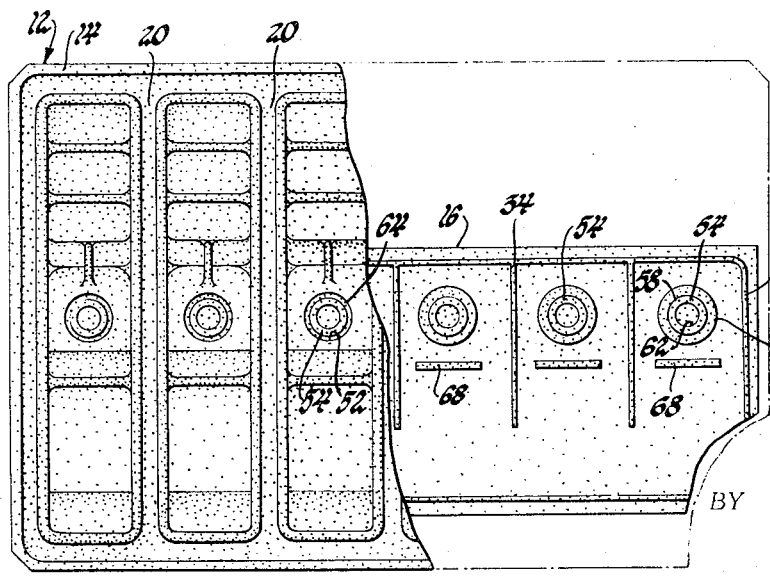
FIG. 4 is a sectional view taken along line 4—4 of FIG. 1.

Turning now to the figures, particularly FIGS. 1 and 2, which show a generally rectangular battery container 10 having an open top side. Container 10 is substantially enclosed on its top side by a cover assembly 12 which includes a generally rectangular shaped cover member 14 and a unitary filler cap member 16. Both the container and cover assembly are constructed out of an acid resisting rubber material. Integrally formed within case 10 are a plurality of upstanding transverse partitions 18. These partitions 18, along with the peripheral upstanding sides of case 10, cooperate with a plurality of transverse grooves 20 in the underside of cover member 14 to define a plurality of separate cell compartments 22. Compartments 22 are substantially in fluid isolation with each other, being interconnected only at a relatively remote longitudinal manifold region 23 within cover assembly 12.

A rectangularly shaped recess 24 extends generally the entire longitudinal length of cover member 14. Recess 24 which consumes about ½ the top surface area of member 14 is closely spaced to one longitudinal side, the manifold side, of member 14 and contains a shoulder 26 substantially about its periphery. Adjacent shoulder 26 within recess 24 is a groove 30 which is also substantially around the periphery of recess 24. A plurality of finger like grooves 32 extend transversely from a longitudinal side of groove 30 opposite the manifold side substantially across recess 24. Transverse grooves 32 which are substantially within the uppermost horizontal plane of cover member 14 generally overlie the partition receiving grooves 20 which are in the underside member of cover 14. Unitary filler cap member 16 is flushly seated substantially within recess 24 by having its periphery rest upon shoulder 26.

Depending ribs 34 extend downwardly from the underside of filler cap 16 and terminate nonengagingly within grooves 30 and 32. These ribs cooperate with shoulder 26 and the vertical side walls of recess 24 to loosely align filler cap member 16 within recess 24.

Formed within cover assembly 12 are transverse elongated vent chambers 36 which overlie each cell compartment 22 and horizontal longitudinal manifold 23. Each vent chamber 36 includes well like recesses 40 within recess 24. Each chamber 36 is situated under the plane of and between each pair of transverse grooves 32. Each well like recess 40 includes a generally horizontal bottom segment 42, vertical side walls 43 adjacent grooves 30 and 32, and curved ramp 44. The upper wall or surface 46 of each vent chamber 36 consists of an overlying underside segment of filler cap member 16 adjacent depending ribs 34. Each curved ramp 44 slopes upwardly in an exponential-like manner having a maximum slope of less than about 45° defining a generally convex surface from bottom segment 42. It terminates by smoothly interconnecting with a horizontal bottom segment 45 of manifold region 23. Each vent chamber 36 is thus in fluid communication with manifold region 23. Manifold 23 is further delineated by an outer longitudinal segment of the underside of filler cap 16 and a longitudinal shoulder 50 adjacent a longitudinal portion of groove 30.

Fluid flow between a cell compartment 22 and its overlying vent chamber 36 is provided by means of a circular vent port or aperture 52 in each horizontal bottom segment 42 of each vent chamber 36. Depending from filler cap member 16 substantially coaxially with each vent port 52 are tubular slush baffles 54. Each baffle 54 includes an upper segment 56 whose outside diameter is about 10 percent greater than port 52 and a lower segment 58 whose outside diameter is about 25 percent less than port 52. A fluid receiving cavity 62 is defined within the inner walls of baffle 54. Each lower segment 58 of tubular baffle 54 cooperates with each filler port 52 to define an annular passageway 64 up from each cell compartment 22 into each vent chamber 36. Spaced from baffle 54 within each chamber 36 is a rib like slush baffle 68 which depends from the underside of filler cap composite 16. Baffle 68 which extends substantially across vent chamber 36 terminates adjacent curvilinear ramp 44 being spaced about .125 inch therefrom and thereby restricting the flow through area within chamber 36.

A typical electrolyte level in a storage battery as described in the foregoing would be about .25 inch below vent chamber 36. This distance could normally be about at least .50 inch to minimize electrolyte loss in a conventionally constructed lead-acid storage battery case. This electrolyte level is designated by reference number 70 shown in FIG. 2. As can be easily visualized, any abrupt motion of the storage battery can cause some electrolyte to enter chamber 36 through passageway 64. It is to be expected that the bulk of the electrolyte propelled upwardly will enter cavity 62 within baffle 54 and drain downwardly from there back into cell compartment 22. Notwithstanding this, any electrolyte entering passageway 64 with sufficient velocity will collide against baffle 54 or baffle 68. The collisions thereagainst will tend to cause this electrolyte to fall back into passageway 64 or onto ramp 44 where it can drain downwardly to aperture 52. The juxtaposition of baffle 54 and baffle 68 which is close to ramp 44 makes it highly unlikely that any electrolyte in bulk form will escape the storage battery through chamber 36. Hence, it is spill-proof.

Electrolyte which can be entrained in gas generated within the storage battery can be carried upwardly by this gas into chamber 36. Since this entrained electrolyte is generally in droplet form it again can collide upon baffles 54 or 68. Here again these droplets tend to be propelled downwardly where they fall back through passageway 64 or on to ramp 44 and drain downwardly into the cell compartments 22. Since depending baffle 68 terminates adjacent ramp 44 it creates an abrupt restriction to the flow of fluid through chamber 36. This restriction can tend to create a turbulent flow of emanating gases through chamber 36. This turbulent flow can tend to cause a greater amount of droplet collisions with the chamber enclosure thereby separating more electrolyte therefrom.

Electrolyte can also escape from a storage battery enclosure through the mechanism of evaporation or vaporization. However, the elongated construction of vent chamber 36 coupled with the exponential-like curvature of ramp 44 provides an extended condensation area. The surfaces within chamber 36 are generally cooler than the emanating gases. Consequently, the vapors can condense onto these surfaces within chamber 36. As mentioned in the previous paragraphs, the gas flow through chamber 36 can be somewhat turbulent. Thus, more of this gas should contact the enclosing surfaces of chamber 36 accomplishing greater condensation.

As has been mentioned in the foregoing discussion, gas can be generated within the confines of a storage battery. This gas is generated predominantly under battery recharge conditions. The accumulation of this gas within an enclosed battery compartment, since it is predominantly hydrogen can be undesirable, particularly if sparks are likely to occur thereabout. Accordingly, each vent chamber 36 is in fluid communication with manifold 23. Manifold 23 as previously mentioned extends longitudinally within cover assembly 12 and has a pair of openings 72 on opposite sides of assembly 12. Vent tubes (not shown) can easily be attached to these openings to lead the hydrogen away to a more desirable location.

It should be appreciated that what has been described has been a storage battery casing which provides means for decreasing the distance between the electrolyte surface and the aperture into the vent system. This reduction in distance could permit one to increase battery plate (not shown) height, thus increasing the energy storage capacity of the battery. Alternatively, one could reduce the battery height, decreasing the overall battery volume. This reduction in height is possible due to a more effective and larger vent chamber for collecting, separating and returning electrolyte back into the cell compartments. The width of each vent chamber as mentioned previously is substantially equal to the cell compartments. Yet, as mentioned, the overall height of the storage battery casing can be less than some comparable batteries.

It should be further appreciated that the design of the battery casing essentially described in the foregoing can permit essentially maintenance free operation. When this is desirable, for example, filler cap member 16 can be permanently sealed within recess 24. One means of sealing such as the placing of a common and well known adhesive substance 74 within the aforesaid grooves, as is illustrated in this preferred embodiment, can be used. Other means of sealing such as using the common and well known heat sealing techniques can be used. If on the other hand, one desires to periodically inspect or service the battery occasionally, flexible latching tangs could be placed at each cell to secure the filler cap member in place.

We claim:

1. A lead-acid storage battery casing adaptable for maintenance free operation which comprises a container having upstanding partitions forming a plurality of cell compartments, a cover member for said container having partition receiving grooves, a recess within the top side of said cover member having a peripheral shoulder, wells each having upwardly curved convex ramps within said recess overlying each of said plurality of cell compartments, an aperture providing fluid communications between said compartments and said wells, grooves within said recess adjacent and between said wells, a filler cap having depending baffles and ribs, said ribs terminating within said grooves within said recess cooperating with said peripheral shoulder to seat said filler cap substantially flush within said recess of said cover member, a first type of said depending baffle terminating in said cell compartments restricting fluid communications between said compartments and said wells, a second type of said depending baffle terminating adjacent said ramps, venting means for venting gases from said cell compartments to the ambient, said partitions and said partition receiving grooves and said depending ribs and said grooves within said recess both in sealing engagement.

2. The storage battery casing as recited in claim 1 wherein the filler cap and the wells in the cover member cooperate to form elongated vent chambers providing a large surface area for separating, collecting and returning electrolyte to the cell compartments and the filler cap and the cover member cooperates to form a longitudinal manifold in fluid communication with the vent chambers and the ambient for venting emanating gases to the battery ambient.

3. The storage battery casing as recited in claim 2 wherein the first type of depending baffle is tubular and substantially coaxial with the aperture having an upper segment with a diameter larger than the aperture and a lower segment with a diameter smaller than the aperture and the second type of baffle being rib like providing a restriction within the vent chamber.

4. A lead-acid storage battery casing adaptable for maintenance-free operation which comprises a container having upstanding partitions forming a plurality of cell compartments, a one-piece primary cover for said container, a plurality of substantially mutually parallel, horizontally elongated venting chambers recessed in the topside of said cover and extending across the cover in a direction which overlies substantial portions of the cell compartments, partition means defining common borders between said chambers and separating said chambers from direct fluid communication with each other along said common borders, wells at the inner ends of said chambers in fluid communication with their corresponding cell compartments via apertures in said wells, a venting manifold at the outer ends of said chambers remote from said wells and located along and substantially adjacent one side of said cover for collecting and conducting vented gases from said chambers to the atmosphere, shallow channel-like necks in said chambers between said wells and said manifold, ramps in said chambers sloping upwardly from said wells to said necks at angles of less than 45° to reflux to said compartments any electrolyte splashing therefrom into said chambers, baffle means transverse said chambers for preventing electrolyte splash from traversing said necks and entering said manifold, and a secondary cover permanently sealed to said primary cover along its periphery and atop said partition means to provide elongated horizontally extending venting chambers having substantial volumes and acid collecting surface areas all yet contained within the covers themselves.

References Cited

UNITED STATES PATENTS

| | | | |
|---|---|---|---|
| 1,996,843 | 4/1935 | Van Meter, Jr. | 136—162 |
| 3,083,256 | 3/1963 | Slautterback | 136—177 |
| 3,329,531 | 7/1967 | Hennen | 136—177 |
| 3,360,403 | 12/1967 | Halsall | 136—170 |
| 3,369,940 | 2/1968 | Slautterback | 136—177 |
| 3,481,793 | 12/1969 | Ihlenburg | 136—178 |

ANTHONY SKAPARS, Primary Examiner

U.S. Cl. X.R.

136—177